Figure 1:
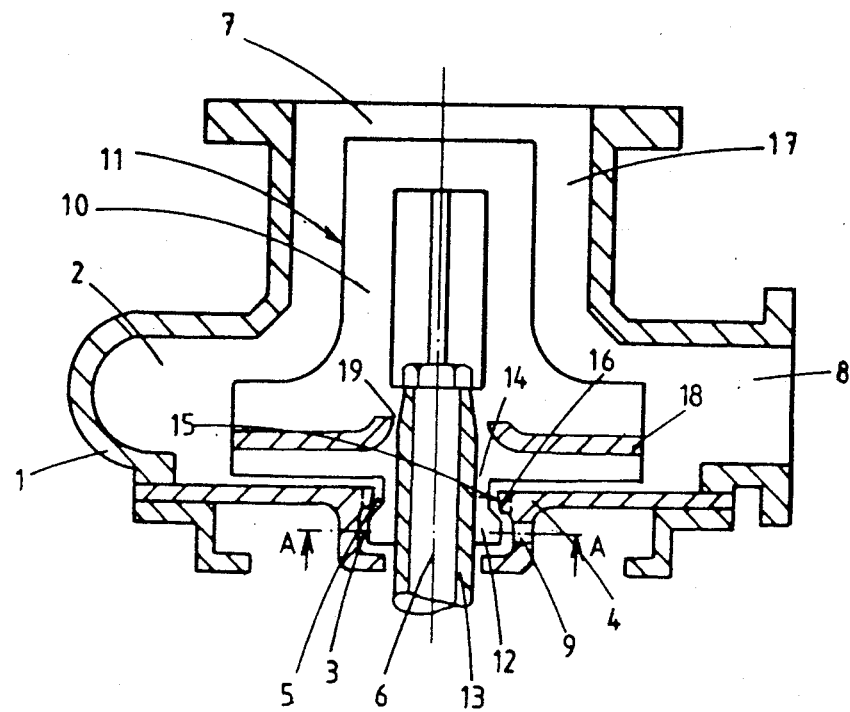

United States Patent [19]

Fellman et al.

[11] Patent Number: 4,675,033
[45] Date of Patent: Jun. 23, 1987

[54] APPARATUS FOR SEPARATING GAS FROM A FIBRE SUSPENSION

[75] Inventors: Raimo Fellman, Karhula; Toivo J. Niskanen, Hamina, both of Finland

[73] Assignee: A. Ahlstrom Corporation, Karhula, Finland

[21] Appl. No.: 847,178
[22] PCT Filed: Jul. 18, 1985
[86] PCT No.: PCT/FI85/00055
 § 371 Date: Feb. 19, 1986
 § 102(e) Date: Feb. 19, 1986
[87] PCT Pub. No.: WO86/00542
 PCT Pub. Date: Jan. 30, 1986

[30] Foreign Application Priority Data

Jul. 17, 1984 [FI] Finland .................................. 842863

[51] Int. Cl.⁴ ............................................. B01D 53/22
[52] U.S. Cl. .......................................... 55/203; 55/406
[58] Field of Search ........................ 55/203, 406, 408

[56] References Cited

U.S. PATENT DOCUMENTS 4,410,337 10/1918 Gullichsen et al. .................... 55/21
4,435,193 3/1984 Gullichsen et al. .................... 55/21

FOREIGN PATENT DOCUMENTS 584875 12/1977 U.S.S.R. ................................ 55/406

Primary Examiner—Bernard Nozick
Attorney, Agent, or Firm—Nixon & Vanderhye

[57] ABSTRACT

In an apparatus for separating gas from a high consistency fibre suspension, the apparatus comprising a rotor chamber (2) containing a first rotor (11) provided with blades (10), a gas space (3) containing a second rotor (13) provided with blades (12), a wall disposed between the rotor chamber and the gas space consititutes an annular gas discharge channel surrounding a shaft rotating the rotors. Rotating blades (14) are disposed in the gas discharge channel between the first and the second rotor.

7 Claims, 2 Drawing Figures

U.S. Patent  Jun. 23, 1987  4,675,033

APPARATUS FOR SEPARATING GAS FROM A FIBRE SUSPENSION

The present invention relates to an apparatus for separating gas from a fibre suspension. The apparatus is particularly intended to be used for pulps of high consistensy, e.g. 6 to 15%. An apparatus of this kind for separating gas is disclosed e.g. by U.S. Pat. No. 4,410,337.

An object of the present invention is to provide an apparatus by which a disadvantage of the apparatus of the above U.S. patent can be eliminated.

The air contained in the pulp is removed through a discharge channel in a wall between a rotor chamber and a gas space. In order to prevent pulp from flowing into the gas space during operation the annular gas discharge channel must be as low as possible. Consequently the channel is easily clogged. The channel can be maintained open by the solution provided by the present invention which is substantially characterized by the feature that rotating blades are disposed in the gas discharge channel between a first and a second rotor. Preferably the gas discharge channel expands in the direction of flow so as to facilitate the discharge of pulp from the channel.

The invention is described in detail below with reference to the accompanying drawing in which FIG. 1 is a sectional view in the length direction of an embodiment of the apparatgus according to the invention.

Figure 2:
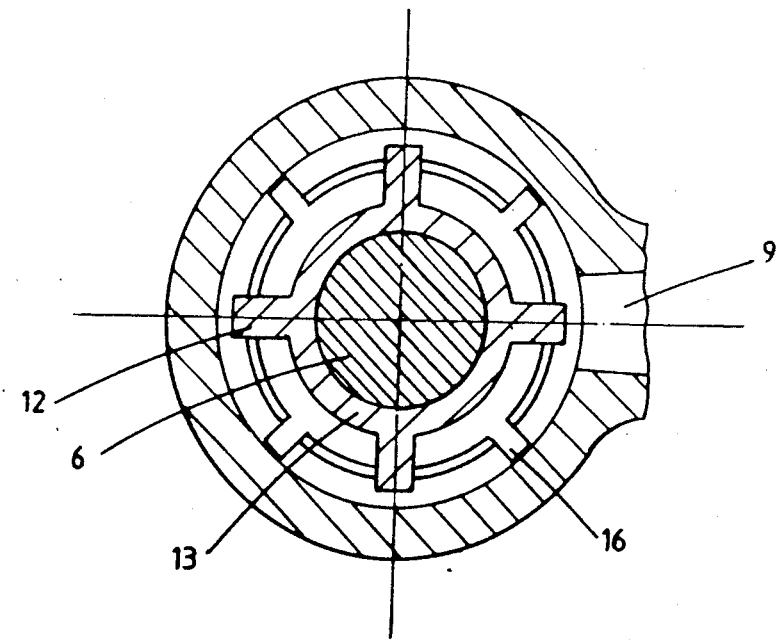

FIG. 2 is sectional view along line A—A of FIG. 1.

The apparatus illustrated in the figures comprises a housing 1 containing a rotor chamber 2 and a gas chamber or space 3. Between the rotor chamber and the gas space, a wall 4 is disposed to form a gas discharge channel 5 around a shaft 6 which is rotatably mounted on bearings, said channel connecting the rotor chamber and the gas space to each other. The housing is provided with an inlet 7 through which pulp is supplied into the rotor chamber, and an outlet 8. The gas space is provided with an outlet 9. A rotor 11 provided with blades 10 (first blades) is mounted on the shaft in the rotor chamber. Another rotor 13 provided with blades 12 (second blades) is mounted on the shaft in the gas space. Blades or ribs 14 (third blades) rotated by the shaft are disposed in the gas discharge channel between the first rotor 11 and the second rotor 13. Blades 10, 14 and 12 constitute a surface extending from the first rotor to the other. The outer surface 15 of the gas discharge channel is provided with grooves 16. The shaft is driven by a device which is not illustrated on the drawing.

While rotating, the rotor 11 sets the pulp in an inlet channel 17 in rotating motion whereby air and pulp are separated from each other and an air bubble surrounded by pulp is formed in the center of the rotor. The rotor also fluidizes the pulp which enables transport of high consistency pulps.

The air separated from the pulp is guided from the rotor chamber into the gas space via outlets 19 in a back wall 18 of the rotor 11 and via the gas discharge channel and is removed through the outlet 9.

While rotating, the ribs 14 (third blades) functioning as extensions of the first blades 10 of the rotor 11 cause the pulp which may have entrained in the channel to flow and thus keep the channel open. Grooves or recesses 16 intensify the effect of the ribs.

The blades of the rotor 13 prevent the gas space from being clogged and fluidize the pulp gathered in the gas space during a stand-still.

The invention is not limited to the embodiment illustrated as an example, only, but it can be modified within the scope of protection defined by the patent claims.

We claim:

1. Apparatus for separating a gas from a high consistency fiber suspension comprising:
   a housing including an inlet and outlet for high consistency fiber suspension;
   a rotor chamber in said housing containing a first rotor portion provided with first blades;
   a gas chamber in said housing containing a second rotor portion provided with second blades;
   a shaft operatively connected to the rotor portions for effecting rotation of the rotor portions about a common axis of rotation;
   a wall between the rotor chamber and the gas chamber defining an annular gas discharge channel surrounding said shaft; and
   third blades disposed in said gas channel between said first and second rotor portions, and operatively connected to said shaft for rotation therewith wherein said inlet is located above said rotor chamber, and said outlet is located in a peripheral surface of said rotor chamber.

2. An apparatus as recited in claim 1, characterized in that the outer surface of the gas discharge channel is provided with grooves.

3. An apparatus as recited in claim 1, characterized in that at least a part of the third blades constitute a surface extending from one rotor portion to the other.

4. Apparatus as recited in claim 3 wherein the gas discharge channel expands towards the gas chamber.

5. Apparatus as recited in claim 3 wherein the outer surface of the gas discharge channel is provided with grooves.

6. An apparatus as recited in claim 1, characterized in that the gas discharge channel expands towards the gas chamber.

7. Apparatus as recited in claim 6 wherein the outer surface of the gas discharge channel is provided with grooves.

* * * * *